US012637028B2

(12) United States Patent　　　　(10) Patent No.: US 12,637,028 B2
Carroll　　　　　　　　　　　　　　　　(45) Date of Patent: May 26, 2026

(54) AUTONOMOUS VEHICLE PASSENGER ACCESS SYSTEMS AND METHODS

(71) Applicant: David W. Carroll, Grantsburg, WI (US)

(72) Inventor: David W. Carroll, Grantsburg, WI (US)

( * ) Notice: Subject to any disclaimer, the term of this patent is extended or adjusted under 35 U.S.C. 154(b) by 72 days.

(21) Appl. No.: 18/896,038

(22) Filed: Sep. 25, 2024

(65) Prior Publication Data

US 2025/0100506 A1　　Mar. 27, 2025

Related U.S. Application Data

(60) Provisional application No. 63/540,158, filed on Sep. 25, 2023.

(51) Int. Cl.
| | |
|---|---|
| *B60R 25/01* | (2013.01) |
| *B60G 17/017* | (2006.01) |
| *B60J 5/06* | (2006.01) |
| *B62D 24/00* | (2006.01) |
| *B60L 50/60* | (2019.01) |

(52) U.S. Cl.
CPC ............ *B60R 25/01* (2013.01); *B60G 17/017* (2013.01); *B60J 5/062* (2013.01); *B62D 24/00* (2013.01); *B60G 2500/30* (2013.01); *B60L 50/60* (2019.02)

(58) Field of Classification Search
CPC .. B60R 25/01; B60G 17/017; B60G 2500/30; B60J 5/062; B62D 24/00; B62D 63/02; B60L 50/60
See application file for complete search history.

(56) References Cited

U.S. PATENT DOCUMENTS

| | | |
|---|---|---|
| 5,738,378 A | 4/1998 | Yazejian |
| 7,721,837 B1 | 5/2010 | DeVeau |
| (Continued) | | |

FOREIGN PATENT DOCUMENTS

| | | |
|---|---|---|
| CN | 207060251 U | 3/2018 |
| CN | 111422156 A | 7/2020 |
| (Continued) | | |

OTHER PUBLICATIONS

"Lowering Suspension: Pros and Cons" May 2020, Lesschwab.com (Year: 2020), 4 pages.

*Primary Examiner* — Xiao En Mo
(74) *Attorney, Agent, or Firm* — Dicke, Billig & Czaja, PLLC

(57) ABSTRACT

AV passenger access systems and methods for providing access to an interior of a passenger pod or body of the AV that is otherwise connected to a power platform. As part of a passenger access operation, a surface of a slidable door of the passenger pod is brought into contact with a tire of the platform. The tire is then rotated by a motor, causing the door to slide or move between an opened position and a closed position. In some embodiments, one or more components of a suspension system of the AV is utilized to effect tire-to-door contact. In some embodiments, the passenger access systems and method of the present disclosure leverage safe exit architecture and strategies (and vice-versa), operating to move one or more of the slidable doors via wheel contact, but without unlocking the body from platform.

3 Claims, 10 Drawing Sheets

(56) References Cited

U.S. PATENT DOCUMENTS

| | | | |
|---|---|---|---|
| 8,892,304 B2 * | 11/2014 | Lu ..................... | B60G 17/0165 |
| | | | 701/37 |
| 9,517,686 B1 | 12/2016 | Paramasivam et al. | |
| 10,093,183 B2 | 10/2018 | Murata | |
| 10,370,035 B2 | 8/2019 | Fees et al. | |
| 10,611,412 B1 | 4/2020 | Attia | |
| 11,618,474 B2 | 4/2023 | Carroll | |
| 11,796,321 B2 | 10/2023 | Glatfelter et al. | |
| 2007/0035148 A1 | 2/2007 | Ellenrieder et al. | |
| 2008/0147277 A1 | 6/2008 | Lu et al. | |
| 2014/0367930 A1 * | 12/2014 | Zeweke ............ | B60G 17/0165 |
| | | | 280/5.514 |
| 2015/0133041 A1 | 5/2015 | Kiya | |
| 2016/0176322 A1 | 6/2016 | Frommann et al. | |
| 2017/0225724 A1 | 8/2017 | Andersen | |
| 2018/0001854 A1 | 1/2018 | Yang et al. | |
| 2019/0263265 A1 | 8/2019 | Ferenczi et al. | |
| 2020/0062146 A1 | 2/2020 | Freienstein et al. | |
| 2020/0148050 A1 | 5/2020 | Lian et al. | |
| 2021/0370921 A1 | 12/2021 | Silva et al. | |

FOREIGN PATENT DOCUMENTS

| | | | |
|---|---|---|---|
| JP | 2002310680 A | 10/2002 | |
| JP | 4784535 B2 | 10/2011 | |
| WO | 2020039270 A1 | 2/2020 | |

* cited by examiner

100

102

100

102

AUTONOMOUS VEHICLE PASSENGER ACCESS SYSTEMS AND METHODS

CROSS-REFERENCE TO RELATED APPLICATIONS

This Non-Provisional Patent application claims the benefit of the filing date of U.S. Provisional Patent Application No. 63/540,158, filed Sep. 25, 2023, the entire teachings of which are incorporated herein by reference.

BACKGROUND

The present disclosure relates to autonomous electronic vehicles. More particularly, it relates to performance features for autonomous electronic vehicles.

Autonomous electronic vehicles (AVs) are currently being tested in several city locations by manufacturers such as Waymo, Cruise and Tesla. Some are operating now as driverless taxis. Many major vehicle manufacturers are expending considerable resources and efforts to devise a viable AV product. They are showing success with these efforts. It is therefore likely this change to autonomous will become the majority type of transportation over the coming years. Currently-envisioned AV systems use advanced computing, sensors and electronic drive vehicle components and structures to accomplish this new autonomy. The recent AV Full Self-Driving (FSD) demonstration by Tesla using artificial intelligence (AI) and neural network architecture shows AV implementation is coming sooner than many considered likely. This will greatly increase safe travel. However, even this system cannot avoid all collisions and those at especially higher speeds will still occur in difficult or unexpected conditions. Thus, the need for a safe exit option for the new AI-based AV remains.

U.S. Pat. No. 11,618,474, the entire teachings of which are incorporated herein by reference, provides a number of AV-related safety and performance features for AV's, including systems and methods for safe exiting. As a point of reference, there are several electronic vehicle (EV) and coming AV designs that use a common feature. It is the use of two major components to build the completed EV. One major component is sometimes called a platform (or power unit or skateboard) composed of the at least a battery, wheels, motors and steering. Then a second major component, the passenger pod, sometimes called the body, is designed to be attached to the platform. The terms "platform" and "body" are used in the present disclosure. Various controller(s), sensor(s), mechanism(s), etc., are then added to render the base EV design autonomous (e.g., converting the EV to an AV). With some embodiments of the '474 Patent, at least one motor and tire are operated in a controlled manner to send a released passenger pod away from the power platform when sensors and analysis determine the status is an imminent collision status. This system is critical to address the last remaining reasons for buyers/users to not accept a totally automated transportation vehicle, safety. It does this by addressing the now much smaller likelihood, but still understood as some remaining, chance of death or serious injury in some situations. Until this is addressed it will be hard for many potential AV buyers/users to give up driver control.

AV with the exit system described above greatly reduces inertia through weight and speed reduction, better avoidance of direct impacts and increasing the ground friction to shorten the stoppage distance. The released passenger pod uses the whole bottom to increase drag by approximately 50×. It also uses pre-emergency status to plan nested calculation time to find and implement at the ready a select safer released passenger pod path. Critically, AV with AI direction may not have the potential to use just steering and breaking based due to ground control or situational limitations, or any other options to avoid direct impact (such as a head-on) to avoid safety loss situations. Releasing the passenger pod at certain speeds and doing so with a planned safer direction by ejection can reduce or eliminate a force of impact. Yet, all this could use some addition purpose. The purchase of this important safety system would be more acceptable if also usable in daily application.

To accomplish the AV Exit system described above, several changes in AV design are implicated. This may include the passenger pod capture/release mechanisms, tire contact ledges, safe exit path considerations, decision making processing, new software-based decision making and physical implementation mechanical features like in-wheel motors and suspension types to permit this system to exit/eject passengers away from collisions. It would be helpful to demonstrate to buyers/users that the system is useful for more than safety.

In addition to safety, AVs present numerous other opportunities for improvements over conventional automotive designs. For example, two or more hinged doors are commonplace with virtually all automobiles to facilitate passengers getting into and out of the vehicle. These doors can be highly complex with a multitude of parts. While well-accepted, overall costs are greatly increased. Moreover, as with other modern features available with EVs and AVs, consumers expect and desire new, unique ways for entering/exiting a vehicle.

SUMMARY

The inventor of the present disclosure has recognized a need to address one or more of the above-mentioned problems. The automated passenger access systems of the present disclosure provides several solutions to each of these shortcomings.

DETAILED DESCRIPTION

Figure 1:
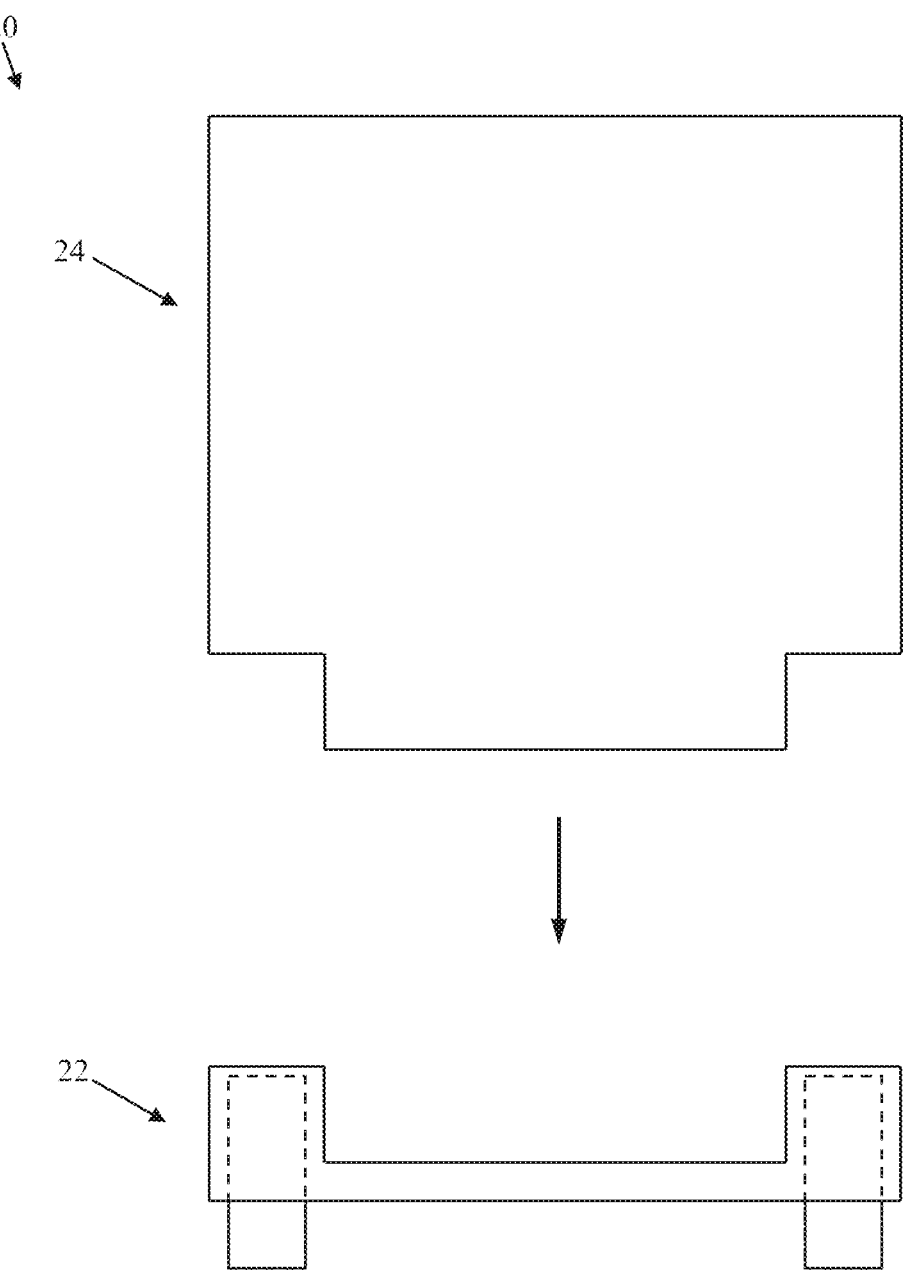
FIG. 1 is a simplified, exploded end view of an autonomous electronic vehicle in accordance with principles of the present disclosure and including a platform and a body.
Figure 2:
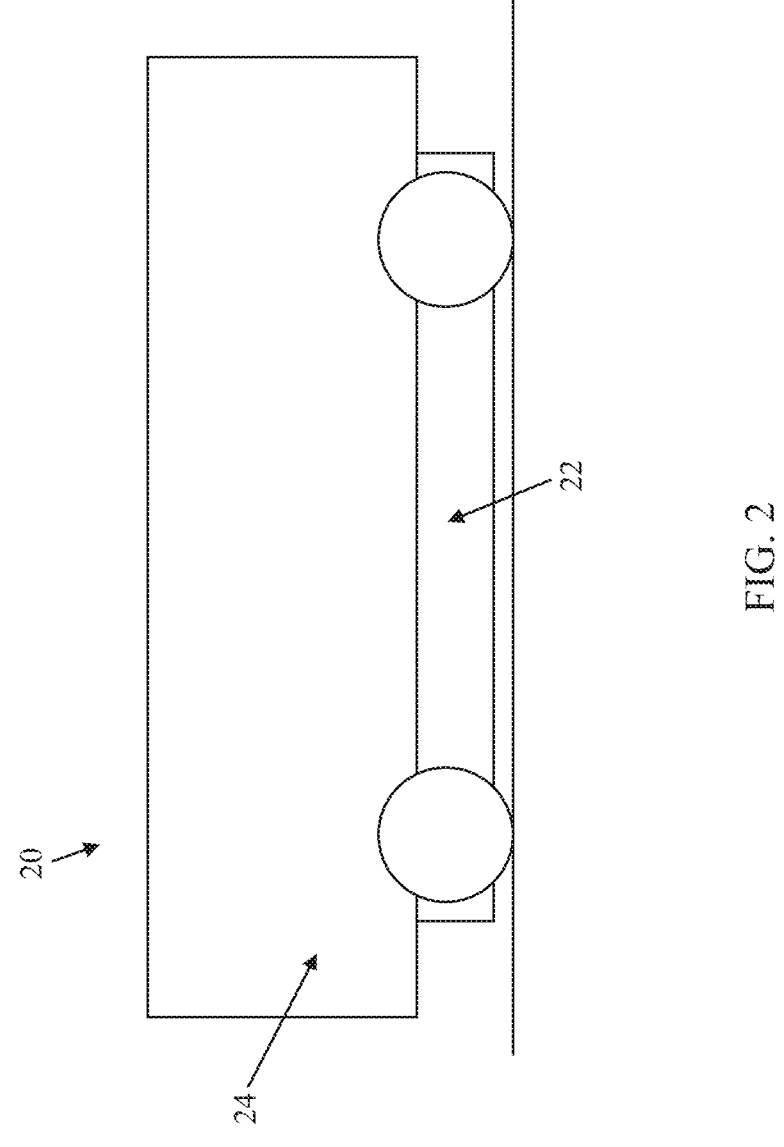
FIG. 2 is a simplified side view of the autonomous electronic vehicle of FIG. 1 upon final assembly.

Some aspects of the present disclosure are directed to autonomous electronic vehicles (AVs) with automated passenger access (e.g., passenger ingress/egress) features. In some embodiments, the automated passenger access features leverage components and operational strategies provided by a safety system of the AV. FIGS. 1 and 2 schematically reflect an AV 20 of the present disclosure that includes a platform 22 and a body (or "passenger pod" or "pod") 24. The platform 22 can be, or can be akin to, platforms typically associated with known or existing AVs. Thus, the platform 22 can include at least the requisite battery, wheels, motors and steering mechanism as known in the art for operation of an AV. In other embodiments, the platform 22 can include one or more additional components not typically utilized or provided with a conventional EV platform as described below. One or more operational controllers (not shown) are provided with one or both of the platform 22 and the body 24, and generally comprise a computer or computer-like device (e.g., processor(s) or microprocessor(s) operating or programmed to operate (software) various instructions or logic, memory, storage device, etc.) that control normal operations of the AV 20 (e.g., turning motor on/off, speed, acceleration, steering, braking, etc.). The body 24 includes an exterior shell defining an interior area for passengers and cargo. Various mechanical, electro-mechanical, displays, and other types of controls are provided with, or carried by, the body 24 for interfacing with users, as well as features that enhance a user's experience (e.g., windows, seats, etc.). As used throughout the present disclosure, the terms "passenger body", "body", "passenger pod" and "pod" also refer to components other than the power platform 22 portion of the AV 20 which may also be purposed for non-passenger purposes.

As reflected by FIG. 1, the platform 22 and the body 24 have complementary shapes or footprints; upon final assembly, the body 24 nests within the platform 22. Various connections between the platform 22 and the body 24 are described in greater detail below. In more general terms, in some embodiments, a releasable connection between the platform 22 and the body 24 can be provided; in other embodiments, the body 24 can be permanently assembled or mounted to the platform 24. Regardless, with some embodiments of the present disclosure, the body 24 is sized and shaped such that upon final assembly to the platform 22, one or more surfaces or segments of the body 24 are arranged over a corresponding one of the wheels of the platform 22. This arrangement, in turn, serves as a portion of the passenger access systems and methods of the present disclosure. For example and with reference to FIG. 3A, the platform 22 can include four wheel assemblies, two of which are visible in the view and labeled as 40, 42. Each of the wheel assemblies of the platform 22 (including the wheel assemblies 40, 42) incorporates or includes a tire and a motor (e.g., in-wheel axial flux motor). The body 24 is formed to provide a primary shell or outer frame 50 (e.g., including a roof and a floor of the body 24) along with one or more panels or doors, for example first and second doors 52, 54, that are slidably maintained by the outer frame 50. The first door 52 defines a surface or face 56 that, upon final assembly, is aligned with or over a tire of the first wheel assembly 40. The second door 54 similarly defines a surface or face 58 that, upon final assembly, is aligned with or over a tire of the second wheel assembly 42. Under normal operating conditions, the doors 52, 54 are secured in the closed position shown at a seam 60 by appropriate locks or locking mechanisms; further, a spacing is maintained between the tire of the first wheel assembly 40 and the first door surface 56 and between the tire of the second wheel assembly 42 and the second door surface 58, allowing the tires of the wheel assemblies 40, 42 to freely rotate relative to body 24 as the AV 20 travels along a road 62. Various devices or mechanisms can be employed to secure the doors 52, 54 in the closed position at the seam 60 (it being understood that with other embodiments in which a single door is provided at one side of the AV, the seam 60 is formed between, and the locating mechanism(s) are located at, the single door and the outer frame 50). In some embodiments, the door connection at the seam 60 of closure can have an increased number and higher strength interlock. This improves roll cage protection to passengers positioned within the body 24.

Figure 3A:
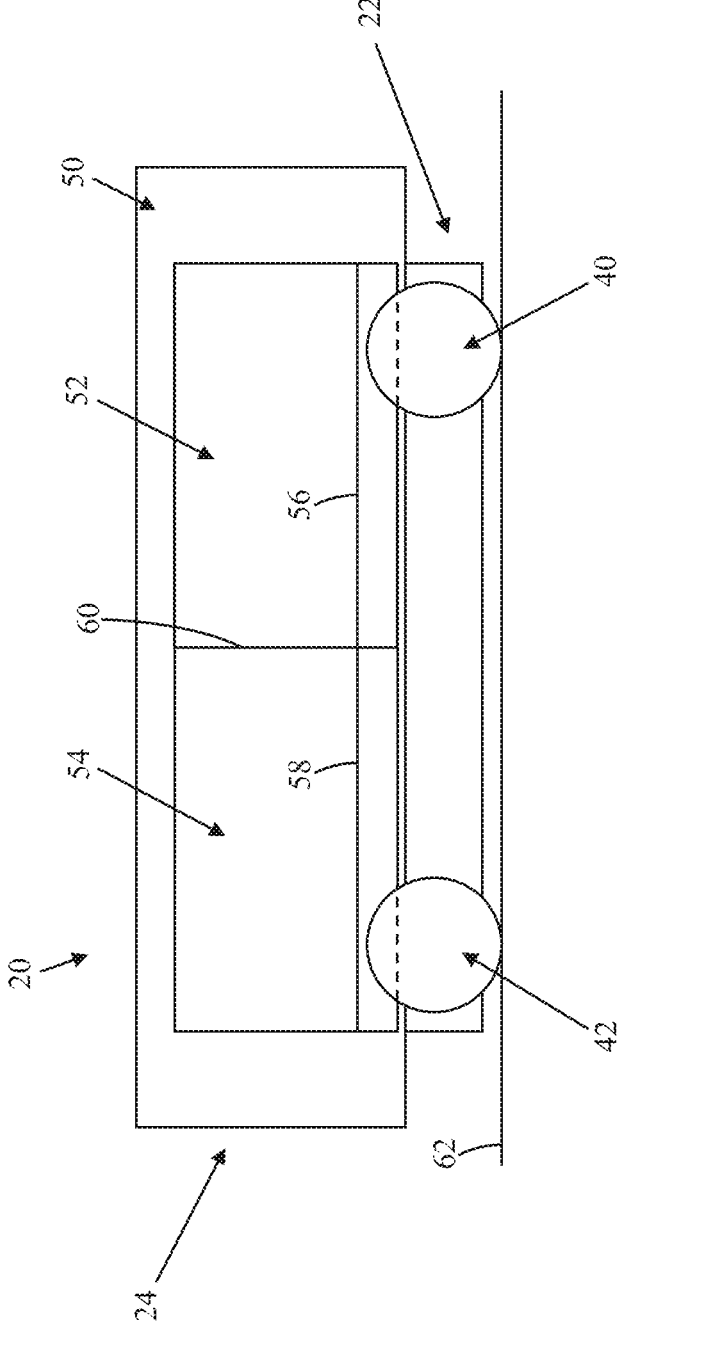
FIG. 3A is a simplified side view of the autonomous electronic vehicle of FIG. 2 and illustrating doors provided with the platform in a closed position.
Figure 3B:
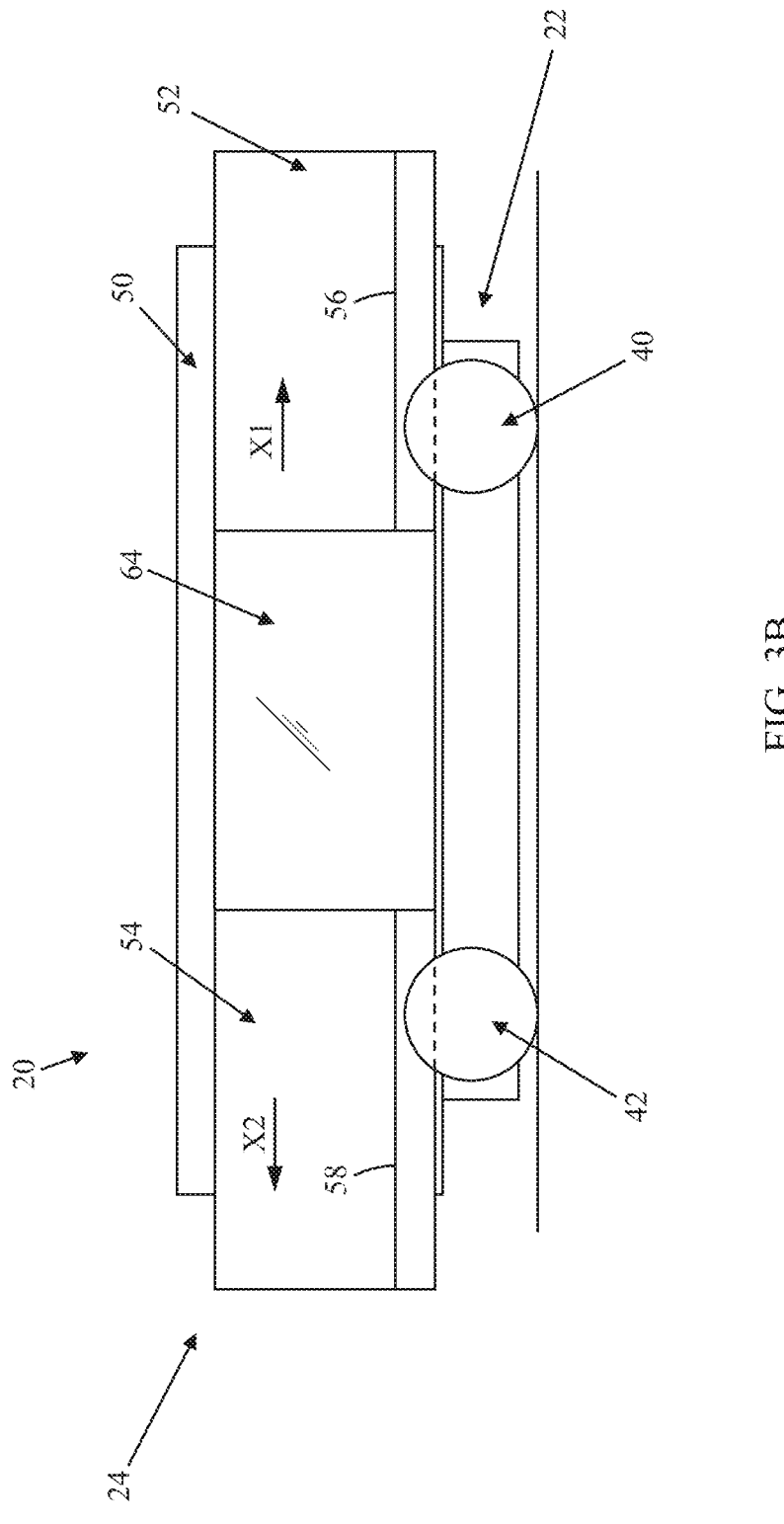
FIG. 3B is a simplified side view of the autonomous electronic vehicle of FIG. 3A with the doors in a closed position.
Figure 4A:
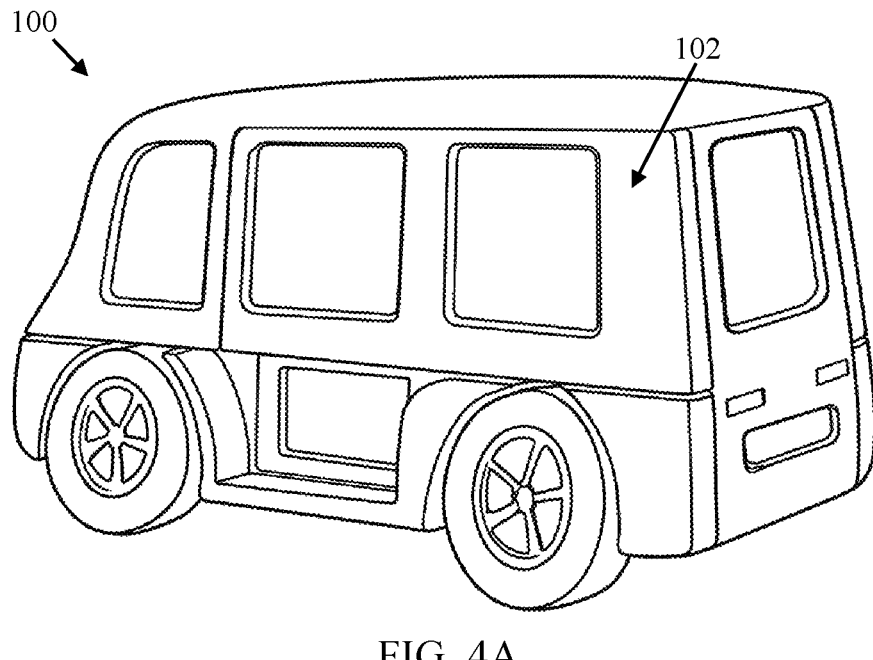
FIG. 4A is a side perspective view of an autonomous electronic vehicle in accordance with principles of the present disclosure including a door in a closed position.
Figure 4B:
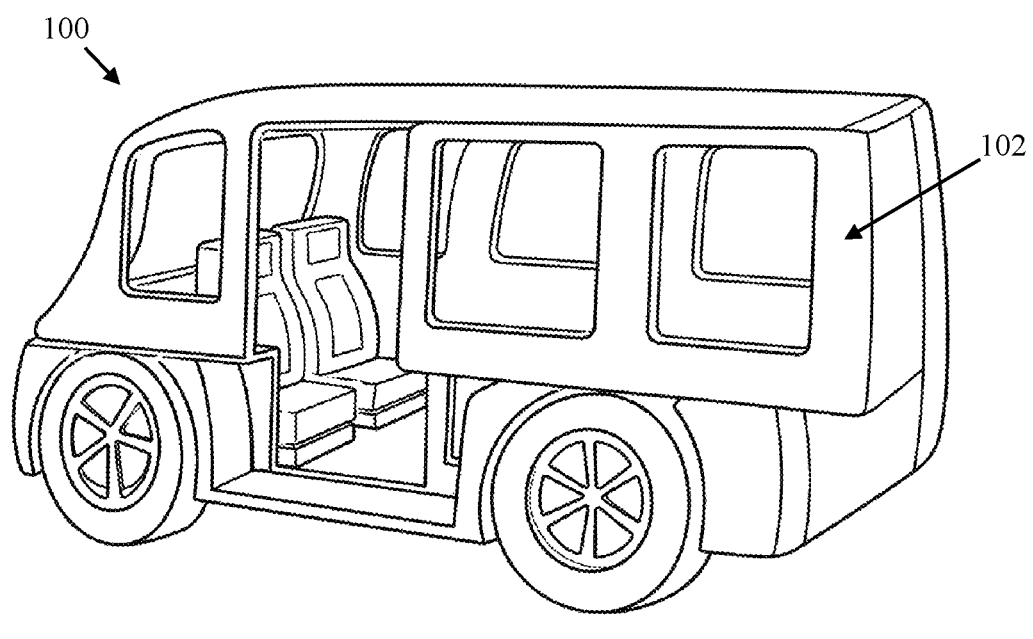
FIG. 4B is a side perspective view of the autonomous electronic vehicle of FIG. 4A with the door in an opened position.

When a need for passenger ingress/egress is implicated, the AV 20 is operated to unlock the doors 52, 54 from one another at the seam 60; further, the AV 20 is operated to cause contact between the tire of the first wheel assembly 40 and the first door surface 56 and/or between the tire of the second wheel assembly 42 and the second door surface 58 as described in greater detail below. Once in contact, the tire is prompted to rotate in a direction that forces the corresponding door 52, 54 to travel away from the closed position. For example, FIG. 3B reflects the first wheel assembly 40 having been operated to move the first door 52 in the direction X1 and the second wheel assembly 42 having been operated to move the second door 54 in the direction X2. In this arrangement, an access opening 64 is formed to an interior of the body 24, allowing ingress/egress of passengers, cargo, etc. The steps are reversed to close the opening 64 when desired. It will be understood that only one of the doors 52, 54 need be moved from the closed position (FIG. 3A) to establish a sufficiently-sized access opening. Further, while FIGS. 3A and 3B illustrates two of the slidable doors 52, 54 along the side of the body 24 in the view, in other examples, only a single slidable door need be provided. The single door can be sized and positioned to selectively interface with one or both of the wheel assemblies 40, 42. One non-limiting example of an AV 100 with a passenger access system in accordance with principles of the present disclosure and providing passenger body with a single sliding door or panel 102 along one side thereof is shown in FIGS. 4A (closed position) and 4B (access opening). Returning to FIGS. 3A and 3B, in other embodiments, in addition to the door(s) 52, 54, one or two slidable doors can be provided along the opposite side (not visible in the views) of the body 24, arranged to selectively interface with corresponding wheel assemblies of the platform 22 as described above.

Components and other features of the AV passenger access systems of the present disclosure to facilitate the wheel/panel contact utilized to move or translate the panel between closed and opened are described in greater detail below. With any of these embodiments, the AV 20 further includes one or more operational controllers (not shown) operating a passenger access control module (e.g., software or programming operated by a processor of the operational controller) that automatically dictates (e.g., prompts operation of the wheel assembly's motor and the connection mechanisms to work uniformly to open and close the door(s) 52, 54. The passenger access control module can include a dedicated computer or computer-like device separate from the operational controller(s) and operating programming (e.g., logic, machine readable instructions, software, etc.) to perform the various transitioning (e.g., opening and closing) features or instructions described elsewhere.

In addition, various safety features can optionally be incorporated into the AV 20, such as the safe exit technologies of U.S. Pat. No. 11,618,474 ("the '474 Patent"), the entire teachings of which are incorporated herein by reference. In general terms, some of the safe exit embodiments of the '474 Patent entail unlocking the body 24 from the platform 22, followed by sending the body 24 along a determined safest exit path via driven contact with one (or more) of the platform wheels. With these and related embodiments, the passenger access systems of the present disclosure can leverage the safe exit architecture and strategies (and vice-versa), operating to move one or more of the slidable doors (e.g., the door(s) 52, 54) via wheel contact, but without unlocking the body 24 from the platform 22. With these and related embodiments, the rarely used safety exit system now also provides automated entry and exit as a reason for tire contact and control movement feature and the investment to accomplish that extra option for exiting using AI based AV control and operation. The dual purpose approach of using the AV safe exit system or typical platform nests features saves in cost for the sensors, processors and some software. It provides the growing use of passenger identification for securing the AV from unapproved users. The continuity of the passenger pod front to back and in a good portion of the pod a side-to-side hit improves roll cage passenger pod framing. In other embodiments, the passenger access systems of the present disclosure can be applied to AV designs not featuring a safety escape system.

Figure 5:
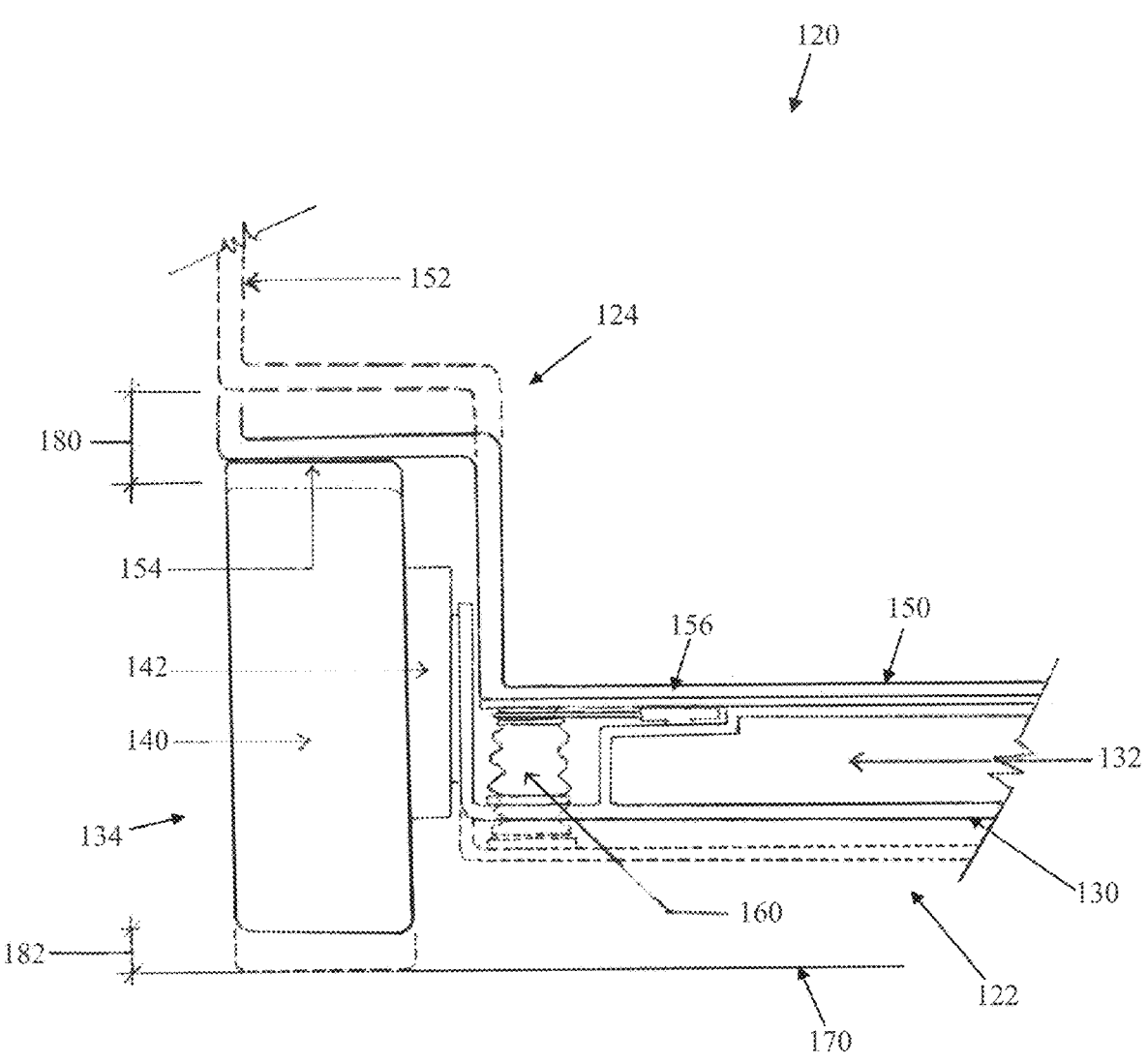
FIG. 5 is a simplified, cross-sectional view of a portion of an autonomous electronic vehicle in accordance with principles of the present disclosure.

Various techniques and mechanisms can be employed to selectively bring the tire of a single one of the platform wheel assemblies into contact with a corresponding door as part of a passenger access operation or routine. In some examples, the systems and methods of the present disclosure utilize or incorporate prompted operation of suspension component(s) of the platform 22. For example, FIG. 5 illustrates portions of an AV 120 incorporating a passenger access system in accordance with principles of the present disclosure. The AV 120 generally includes a platform 122 and a body or passenger pod 124. The platform 122 can be akin to any of the platforms of the present disclosure, and includes framework 130 maintaining a battery 132 and a plurality of wheel assemblies (with a first one of the wheel assemblies 134 being shown in the view). The wheel assemblies (including the first wheel assembly 134) can assume a variety of forms useful for AV (and EV) applications, and generally include a tire or wheel 140. The tire 140 is connected to the framework 130 by an axle (not shown) or the like, and is rotatably driven relative to the framework 130 by a motor 142 (e.g., an axial flux-type motor). The body 124 can also be akin to any of the bodies of the present disclosure and generally includes an outer frame 150 slidably maintaining a door or panel 152. The body 124 is nested within a footprint of the platform framework 130 as shown, with the door 152 forming a surface or face 154 that is arranged over the tire 140 upon final assembly. In some embodiments, the body outer frame 150 can be releasably connected to the platform 122, for example by one or more capture and release mechanisms 156 (referenced generally) described in greater detail below (e.g., as part of a safe exit system). In other embodiments, a more permanent assembly of the outer frame 150 to the platform 122 can be established.

The platform 122 includes suspension system components for maintaining a desired spacing between the door surface 154 and the tire 140 under normal traveling conditions, including a fluid suspension device 160. The fluid suspension device 160 can assume various forms, and can be an air or hydraulic-based device as conventionally used with EV's and other vehicle formats. A separate fluid suspension device 160 can provided for each of the remaining wheel assemblies of the AV 120, with each fluid suspension device 160 being independently operable by one or more controllers (not shown) provided with the platform 122. The fluid suspension device 160 is carried by the platform framework 130, and is arranged to interface with the body 124. More particularly, one side of the fluid suspension device 160 is permanently secured to the framework 130. An opposite side of the fluid suspension device 160 bears against (directly or indirectly) the body 124 (e.g., the outer frame 150). Other suspension system configurations can also be employed, such as a lowrider (typical) hydraulic suspension.

Under normal operating or traveling conditions of the AV 120 (reflected by dashed lines in FIG. 5) along a road 170 in which the door 152 is in a closed position and the body 124 is secured to the platform 122, the fluid suspension device 160 operates to maintain a suspension gap 180 between the tire 140 and the door surface 154. This same relationship is established at the other, remaining tires of the AV 120 via the corresponding fluid suspension device. When the AV 120 is not in motion and an access opening to the body 124 is desired, a passenger access routine is performed. The passenger access routine can incorporate various steps, decisions and/or algorithms. For purposes of initial explanation only, the passenger access routine is described below with specific reference to the components of the AV 120 visible in the view of FIG. 5 and in accord with a decision having been made (e.g., by the on-board passenger access control module) to move the door 152 via driven interface with the tire 140 of the first wheel assembly 134. An operational state of the remaining wheel assemblies (not shown) and corresponding fluid suspension devices (not shown) provided with the AV 120 does not substantively change or otherwise mimic the steps performed at the fluid suspension device 160 and the first wheel assembly 134 for reasons made clear below. With this in mind, the passenger access routine can include the fluid suspension device 160 being prompted to deflate or otherwise decrease in vertical height. This action serves to draw the tire 140 and the door surface 154 toward one another, with the tire 140 lifting off of the ground 170 (represented by solid lines in FIG. 5) as further explained below. A clearance gap 182 can thus be formed between the tire 140 and the ground 170. The door 152 is unlocked relative to the outer frame 150, for example via prompted operation of locking mechanism(s) (not shown, but akin to the locking mechanisms described with respect to the seam 60 in FIG. 3A). With the door 152 unlocked and in contact with the raised tire 140, the motor 142 is prompted to rotate the tire 140, in turn causing the door 152 to slide relative to the outer frame 150 to create the access opening as described above.

Figure 6:
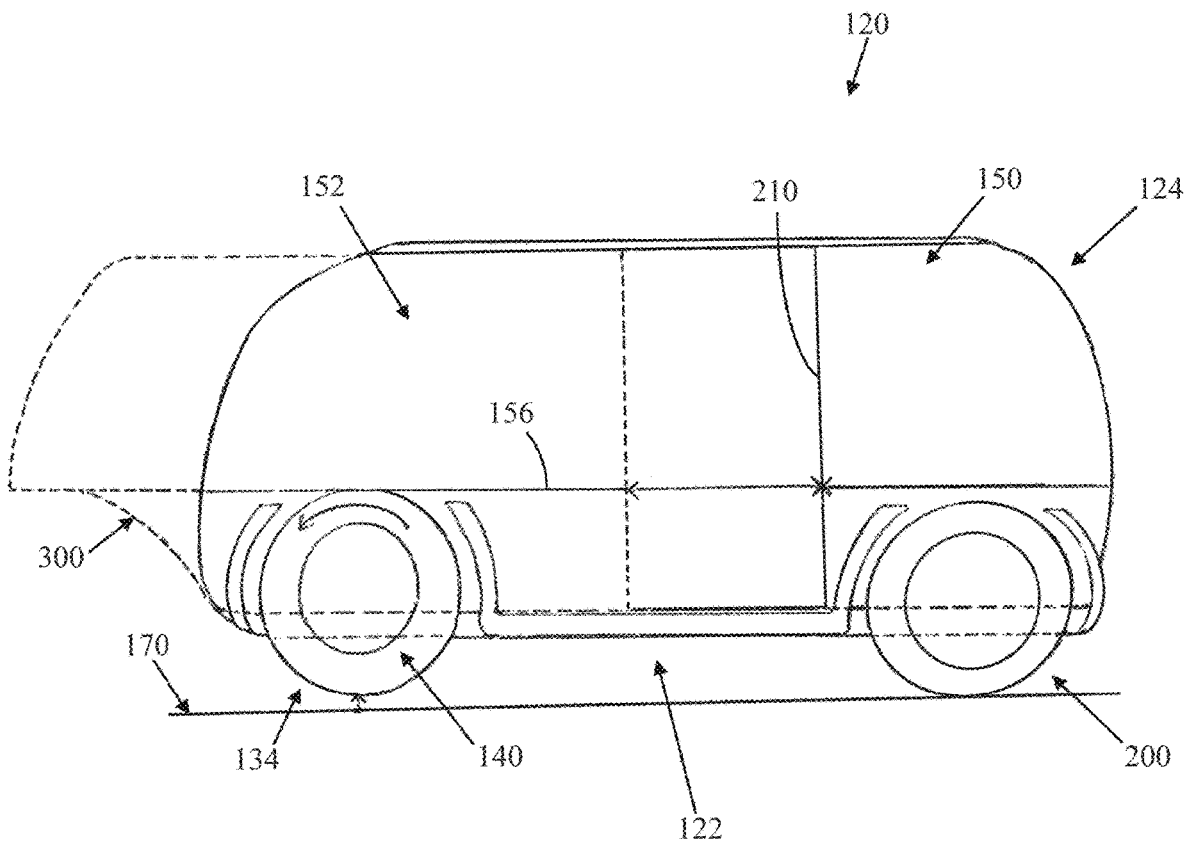
FIG. 6 is a simplified side view of the autonomous electronic vehicle of FIG. 5 and illustrating articulation of a door between a closed position and an opened position.

Lifting of the tire 140 (relative to the ground 170) and into contact with the door 152 via prompted operation of the fluid suspension device 160 can be accomplished by maintaining remaining ones of the AV tires in contact with the ground 170. By way of further clarification, FIG. 6 illustrates the AV 120 performing the passenger access routine to move the door 152 from the closed position (shown with solid lines) to an opened position (shown with dashed lines). Commensurate with the descriptions above, the fluid suspension device 160 (FIG. 5) associated with the first wheel assembly 134 has been actuated to deflate or lessen in vertical height. A second wheel assembly 200 is visible in the view of FIG. 6; it will be understood that third and fourth wheel assemblies are also provided at an opposite side of the AV 120 and are not visible. With this in mind, to effect lifting of the tire 140 of the first wheel assembly 134, the fluid suspension devices (not shown) associated with the remaining wheel assemblies (e.g., the second wheel assembly 200) remain in an inflated or normal state (such that the corresponding tires remain in contact with, and exert offsetting forces against, the ground 170) while the fluid suspension device 160 associated with the first wheel assembly 134 is deflated. With the tire 140 of the first wheel assembly 134 lifted into contact with the door surface 154 and the door 152 unlocked relative to the body outer frame 150 (e.g., via locking mechanisms (not shown) provided at a seam 210), the tire 140 is prompted or driven to rotate in the direction shown, causing the door 152 to move to an opened position.

From the above explanations, in some embodiments the AV's suspension may be used to provide tire contact for moving the released door (or other segment) 152 of the passenger pod or body 124. The result is that if one tire 140 is raised above the ground to move the door 152, the other three tires can hold the AV at a normal height. In some embodiments, the opposite suspension (i.e., opposite the wheel assembly being operated to effect a passenger access operation) may change to help accommodate the lifting and activating access or closing of a door access segment suspension wheel ground gap. This may be for the purpose of vehicle balance or to accommodate the power platform rigidity and resistance to torque or twist. In some embodiments, the amount of independent wheel suspension movement may be determined by vehicle elevation or balance sensors. In some embodiments the amount of change in suspension may contact or only come closer to contact. For example, it may help to provide a lower or higher level for easier access.

The systems and method of the present disclosure can incorporate various techniques or algorithms (e.g., programming provided with the on-board passenger access control module (not shown)) for the manner in which the wheel assembly motor is operated and/or the suspension system is operated as part of a passenger access operation or routine. For example, in some embodiments, operation of the suspension system and the wheel assembly motor can be controlled to cause the tire to partially touch but to not drive the corresponding passenger pod segment (e.g., door) but to hold the vehicle on a slope or to assure the AV position. It may be used to allow drag or timed to just hold solidly when the drive to move tires have performed their action. The power platform is not then stressed or the tires ripping on the pavement. In other states, the at least one wheel assembly motor may be temporarily in a neutral gearing to permit the tire action of another to operate without dragging or spinning of any of the tires on the ground during the automated access process. This may be done in the form as discussed to pulse this operation. The goal is to keep the momentum from growing. In this regard, in some embodiments, the use of the tire contact system may use a software-controlled pulsing of the movement to one tire addressing the door surface or ledge while using a neutral and hold pulsing timed to retain the AV in reasonable stationary status and eliminating the rubbing of the door moving tire on the ground. This can be beneficial if done in this fashion for sloped parking situations. In some embodiments, the pulsing may be used more frequently or on different amounts of time for holding in door opening sequences occurring on steeper slope situations. In some embodiments, this can be an algorithm base on sensors of AV angle or movement of the AV during the door opening.

In some embodiments and under predetermined conditions, such as in a known sufficiently level garage, the front wheel assemblies of the AV may be placed into neutral to permit one or both doors (where provided) to operate using the one or two rear motors and tires on the one or two doors to open or close. In some variations of this operation, a garage-located AV can be caused to await the automated garage doors to open to provide sufficient space for the one or both doors to open or close. In some embodiments, based on the slope or other variations of a particular un-level parking condition, systems and methods of the present disclosure can implement a pulsing between neutral and fixed-to-ground-hold to intermittently retain sufficient stay in place status for entry or exit of passengers. In yet other examples, the on-board passenger access control module can be programmed such that the timing of more than one raised wheel can be sequenced to hold the AV on the level while driving a secondary door for open and closing yet keep three on the ground.

Figure 7:
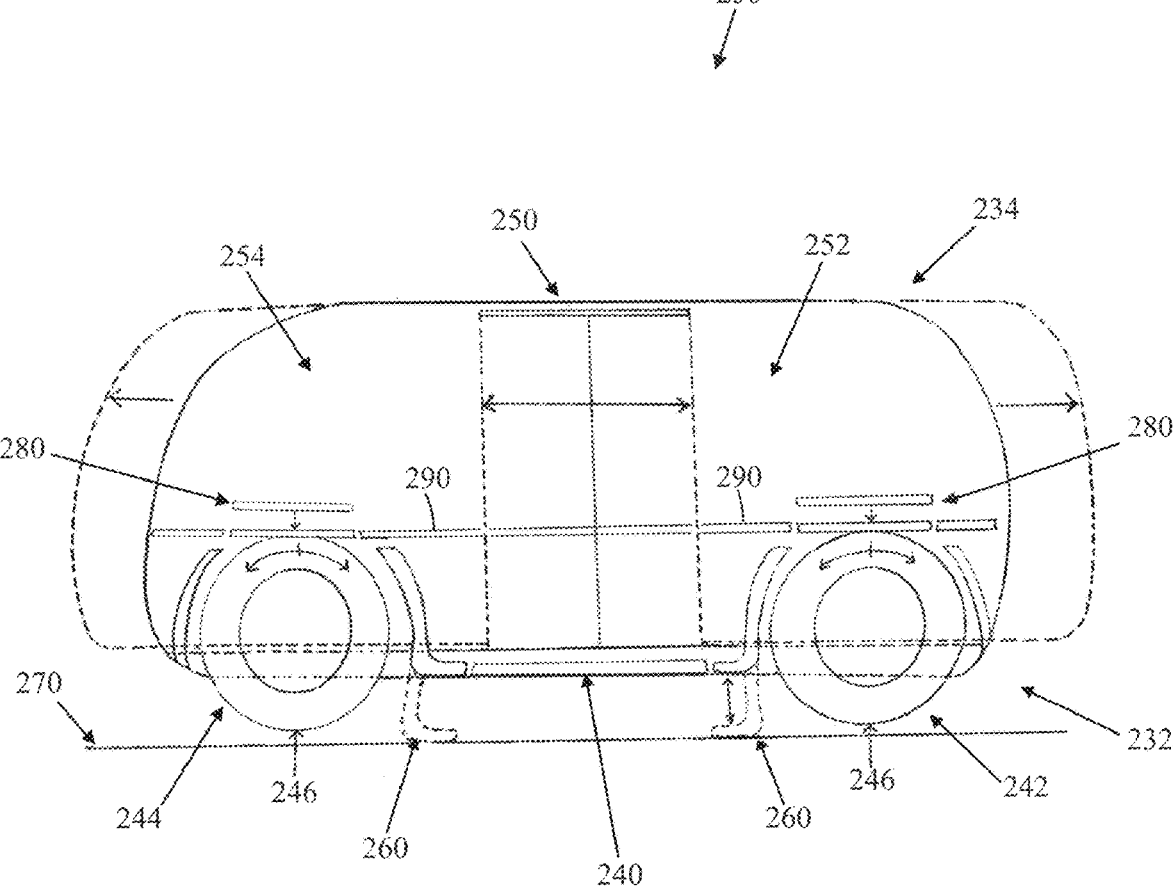
FIG. 7 is a simplified side view of an autonomous electronic vehicle in accordance with principles of the present disclosure and illustrating articulation of doors between a closed position and an opened position.

The suspension-based techniques for effecting tire-to-door contact as part of a door access operation as described above are but one acceptable configuration in accordance with principles of the present disclosure. Other techniques or components can alternatively be employed. For example, another AV 230 in accordance with principles of the present disclosure is shown in FIG. 7 and includes a platform 232 and a body or passenger pod 234. The platform 232 can be akin to any of the platforms of the present disclosure, and includes framework 240 and a plurality of wheel assemblies, such as first and second wheel assembly 242, 244. Each of the wheel assemblies 242, 244 includes a tire 246 and motor (not shown). The body 234 can also assume any of the formats of the present disclosure and includes an outer frame 250 and on or more doors, such as first and second doors 252, 254. The doors 252, 254 are slidably connected to the outer frame 250, and are transitionable between closed positions (drawn with solid lines) and opened positions (drawn with dashed lines). Each of the doors 252, 254 forms or includes surface(s) arranged to interface with the tire 246 of the corresponding wheel assembly 242, 244 as described below. Under normal operating conditions in which the AV 230 is in transit, the door surface(s) are spaced away for the tires 246. Finally, the AV 230 includes two (or more) jack devices 260. The jack devices 260 can assume a variety of forms, and are generally operable to lift the platform framework 240, and thus the tires 246, upwardly relative to ground 270. The jack devices 260 can be configured to be automatically actuated for a lifting or lowering operation (e.g., via a linear motor). In the view of FIG. 7, the jack devices 260 are shown as being in contact with the ground 270. It will be understood that during normal operations of the AV 230 while in transit, the jack devices 260 are retracted or not otherwise in contact with the ground 270. The jack device(s) 260 may also be used to level the AV 230 for various other purposes typical to those used in recreational vehicles.

Movement or travel of the doors 252, 254 is controlled by a passenger access control module (not shown) that otherwise operates to prompt operation of various components or mechanisms. More particularly, as part of a door access operation, the jack devices 260 are actuated to contact the ground 270 and then lift the platform framework 240 a sufficient distance so that the tires 246 are no longer in contact with the ground 270. Engagement (direct or indirect) between the tire 246 of the wheel assembly 242, 244 and the corresponding door 252, 254 intended to be moved is established. In one non-limiting example, the body 234 includes or carries a push plate 280 for each for each of the doors 252, 254. The push plate 280 associated with the first door 252 is arranged over the tire 246 of the first wheel assembly 242; the push plate 280 associated with the second door 254 is arranged over the tire 246 of the second wheel assembly 244; etc. The push plates 280 are each independently moveable (e.g., via operation of a linear actuator) between a raised position and a lowered position. In the raised position, the push plate 280 is spaced away from the tire 246 of the corresponding wheel assembly. In the lowered position, the push plate 280 is brought into contact with the tire 246 of the corresponding wheel assembly (e.g., in the lowered position, the push plate 280 associated with the first door 252 contacts the tire 246 of the first wheel assembly 242). Moreover, in at least the lowered position, a force applied to the push plate 280 is transferred to the corresponding door 252, 254 via an appropriate, physical connection. In some embodiments, the push plate 280 is connected to the corresponding door 252, 254 (e.g., the push plate 280 associated with the first door 252 moves with sliding movement of the first door 252). In some embodiments, each of the doors 252, 254 forms or defines a surface or ledge 290; in the lowered position, the push plate 280 is aligned with the ledge 290 of the corresponding door 252, 254.

With the tires 246 lifted or raised above the ground 270, and the push plate 280 associated with the door intended to be moved in contact with the tire 246 of the corresponding wheel assembly, the wheel assembly is the operated to rotate the tire 246 in a direction appropriate to effect desired movement of the door. For example, where movement of the first door 252 is intended, the tire 246 of the first wheel assembly 242 is driven or rotated. Because the tire 246 has been lifted, the tire 246 can freely rotate relative to the ground 270. Rotation of the tire 246 exerts a force onto the push plate 280 that in turn is transferred to the first door 252, causing the first door 252 to move or slide relative to the outer frame 250. In some embodiments, the push plate 280 will move with sliding movement of the first door 252; after sufficient translation of the first door 252, then, the push plate 280 is no longer "over" the tire 246 of the first wheel assembly 234 and the tire 246 instead is in contact with the ledge 290. Thus, with further driven rotation of the tire 246, the first door 252 will continue to move (due to the interface between the tire 246 and the ledge 290). A variety of other devices or mechanisms can be employed that may or may not include the actuated push plate 280 for achieving a contacting interface between the tire 246 and the corresponding door.

Returning to FIGS. 3A and 3B, the systems and methods of the present disclosure can include or incorporate various techniques (e.g., programming, algorithms, etc., provided with the passenger access control module) for initiating performance of a passenger access routine or operation (e.g., initiating a door opening sequence, initiating a door closing sequence, etc.). In some examples, a user can select or prompt a door opening or door closing operation by pressing a dedicated control or button (e.g., within the AV, on a key fob, etc.) and the operation is automatically initiated. In other examples, the passenger access control module can be programmed to consider available information or data before initiating a door opening or door closing operation. In other non-limiting examples, the access system can use or review sensors to detect the approach of the user and authorization. The sensors may detect the person through imaging. The passenger access control module can, in some embodiments, be programmed to determine an approaching person's motion of a hand or arm as an intent to request access or closure. Alternatively or in addition, the passenger access control module can use wireless with the user's smart phone typically available on AVs today. In yet other examples, the passenger access control module can be programmed to use or consider the individual's preplanned destination and timing intent from a wireless communication typical to that of a smart phone and confirm timing is appropriate for travel intent before initiating a door opening operation.

It will be understood that a distance of travel or movement of the door from the closed position dictates or determines a size of the access opening to the interior of the pod, with the distance of travel corresponding to revolutions of the tire in contact with the door. With this in mind, and in some examples, the passenger access control module can be programmed to prompt the wheel assembly motor to move the corresponding door (via rotation of the tire) by a predetermined or default distance to create the required access opening for passengers. In other examples, the passenger access systems and methods of the present disclosure can effect differently-sized access openings as a function of the particular circumstances and/or in response to a user's prompt. For example, the passenger access control module can be programmed to review data or images from one or more vision-type sensors or cameras provided with the AV to "see" size of a package to be loaded into the AV, number of approaching passengers or in some weather open a lesser amount. In some embodiments, the passenger access control module can be programmed to achieve a smaller amount of access opening where desired (e.g., air into the AV, drive-through for food access, etc.).

In yet other embodiments, the passenger access control module can be programmed to use or consider sensor data to determine how and where to stop the AV for performing a door opening operation. In some embodiments, the passenger access control module can be programmed to operate typical to resistance monitoring and reversing of a window. It may also use one or more additional sensors typical to a garage door where a laser light interruption is applied for reversal. In yet other examples, the passenger access control module can be programmed to prompt adjustment of the AV's position to permit the door movement or in the case of twin doors on one side operating together it may use space fore and aft. The parking of a vehicle may assure space is sufficient or even relocate to a space for sufficient access and optionally notify users of this change. In some embodiments, the passenger access control module can be programmed to use or consider data of additional sensors to verify passengers are sufficiently out of the way (taken their seat or rounded the end of the vehicle) and thus check both internal or external spacing and avoidance of the passenger pod before initiating a door opening or closing operation.

In some embodiments, the passenger access control module can be programmed such that operation of the automated door may by user choice and/or available space; in other examples, the passenger access control module can be programmed to notify the user to use the door's optional manual or other self-powered release and glides. This is likely used for opening a door after an emergency release event or other situations.

In some embodiments, the passenger access control module can be programmed such that operation of the one door or two doors (where provided) can depend on an open, timing or method decision depending on passenger proximity, movement toward a door or identification of approved passengers for operation of a door or a specific door. For example, a younger child may not yet be approved by a parent to use this system automatically, or until a verification limit for a safe condition is deemed by AI to be appropriate. In yet other examples, the passenger access control module can be programmed such that the selection of which door to open and thus provide door operation to or from the AV may be determined by analysis of sensor information to assure safety. For example, this sensing and operation or not to operate may be timed until safe exiting has been determined acceptable based on status of surrounding conditions. In further embodiments, the passenger access control module can be programmed such that automatic use of the door may only permit manual operation based on space or safety limitations.

Figure 8A:
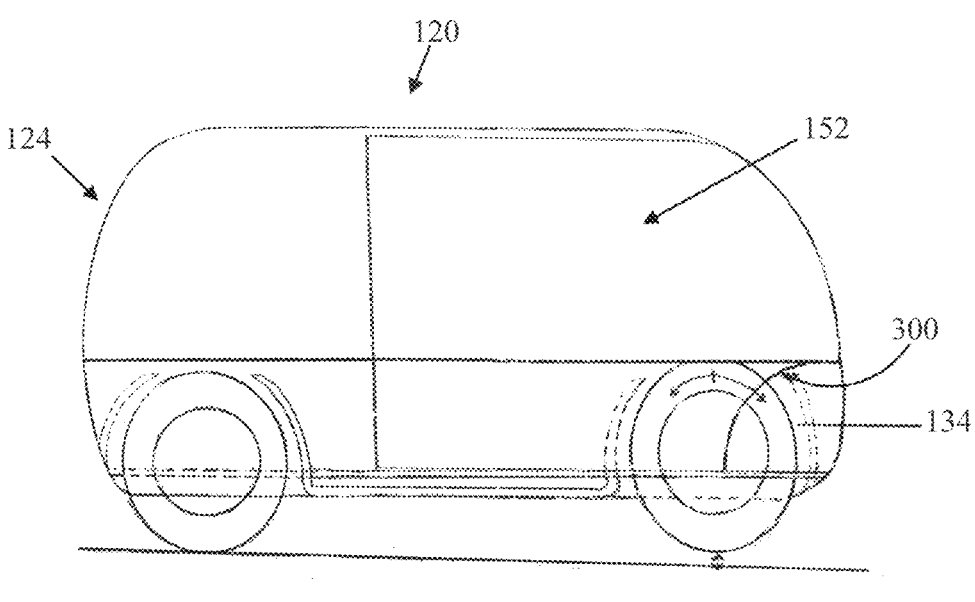
FIG. 8A is a simplified side view of an autonomous electronic vehicle in accordance with principles of the present disclosure.
Figure 8B:
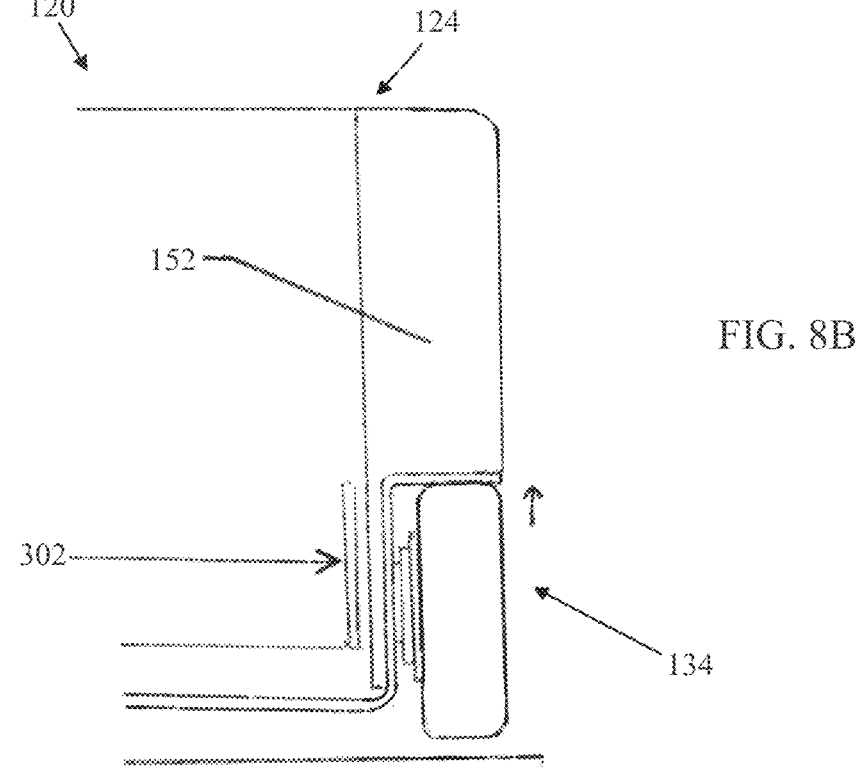
FIG. 8B is a simplified cross-sectional view of a portion of the autonomous electronic vehicle of FIG. 8A.

The AV doors of the present disclosure can assume a variety of different shapes and sizes. In some embodiments, the door partially wraps around the end of the vehicle to strengthen the door as it protrudes the AV. This improves the roll cage too. In other non-limiting examples, the doors of the present disclosure can be shaped and/or sized for clearance about the corresponding wheel assembly. For example, FIG. 6 shows the door 152 as defining a clearance surface 300 that is sized and shaped for clearance about the first wheel assembly 134. FIG. 8A is an interior view of the AV 120 with the door 152 in the closed position and illustrating a location of the clearance surface 300 relative to the first wheel assembly 134. With these and related embodiments, and with additional reference to FIG. 8B, the body 124 can include or carry an interior panel 302 apart from the door 152. The interior panel 302 is generally aligned with the clearance surface 300 (when the door 152 is in the closed position), and serves to limit air and particle flow into/out of an interior of the body 124 through a gap created by the clearance surface 300.

Returning to FIGS. 3A and 3B, the AVs of the present disclosure can optionally include or incorporate additional structural components configured to facilitate desired passenger access operations. For example, the platform and/or the body may include or incorporate an extendable bumper. The extendable bumper can be useful, for example, under circumstances where the space surrounding the AV has obstructions that might otherwise block desired movement of the door to an opened position. With these and related embodiments, the extendable bumper can be actuated in advance of the moving the door. This extension may also be used as a bumper. This bumper may be deployed based on conditions including speed. An addition option is that both doors could extend to absorb impact from a rear end sensor determined status.

Figure 9:
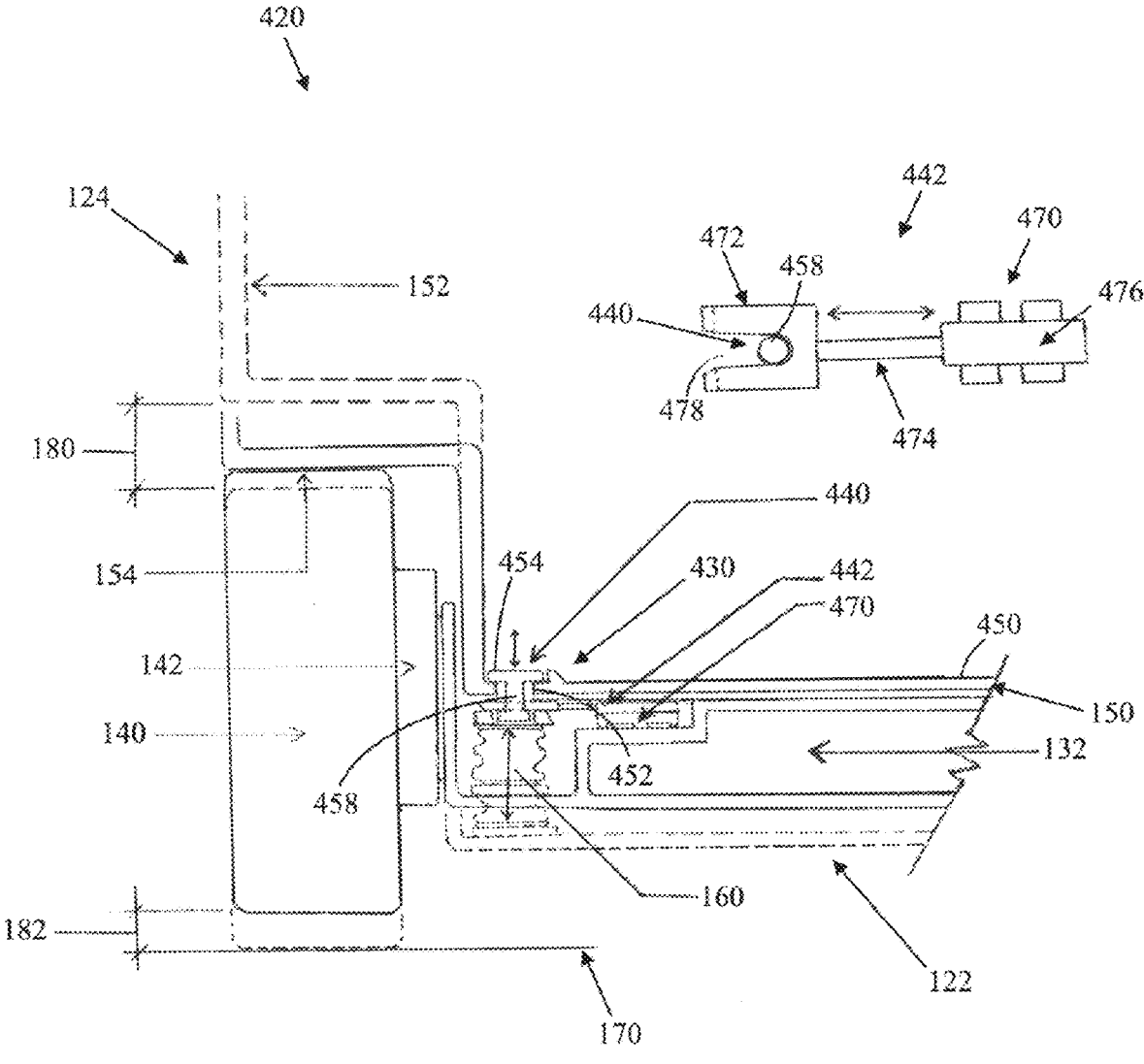
FIG. 9 is a simplified, cross-sectional view of a portion of an autonomous electronic vehicle in accordance with principles of the present disclosure, with the insert to FIG. 9 illustrating an example of a catch device useful with the autonomous electronic vehicle.

As mentioned above, the passenger access systems and methods of the present disclosure can optionally be used with AV's having a safety exit system, such as any of the safety exit systems of the '474 Patent. Moreover, the AVs of the present disclosure can include or incorporate other shape or size transitioning features, such as those describe in U.S. Provisional Application No. 63/471,747 ("the '747 Provisional Application"), filed Jun. 7, 2023 and entitled "Automatically Transitionable Autonomous Vehicle", the entire teachings of which are incorporated herein by reference. With embodiments in which the passenger access systems and methods of the present disclosure are employed with an AV having a safety exit system, various mechanism or devices can be employed to effect a releasable connection between the platform 22 and the body 24, such as any of the capture and release mechanisms described in the '474 Patent or the '747 Provisional Application. Another example of a capture and release mechanism useful with AVs of the present disclosure is shown in FIG. 9. As a point of reference, FIG. 9 illustrates portions of an AV 420 that is otherwise highly akin to the AV 120 described above with respect to FIG. 5. The AV 420 includes the platform 122, the body 124, and the fluid suspension device 160 operable to effect contact between the tire 140 and the door 152 as described above. A capture and release mechanism 430 (referenced generally) releasably connects the outer frame 150 of the body 124 with the framework 130 of the platform 122, and is operable to release the body 124 from the platform 122, for example as part of a safety exit operation described in the '474 Patent.

The capture and release mechanism 430 includes a pin 440 and a catch device 442. In general terms, the pin 440 establishes a releasable connection between the platform 122 and the body 124, with the catch device 442 operable to lock or release the pin 440 from a connected state.

The pin 440 can have a wide variety of forms appropriate for connecting the platform 122 and the body 124. In some embodiments, the pin 440 is sized and shaped to extend between and interconnect a floor 450 of the outer frame 150 of the body 124 and the framework 130 of the platform 122. For example, the floor 450 can form a passage 452 that, upon final assembly, is open to an interior of the framework 130. The pin 440 is sized and shaped to extend through the passage 452 and into the interior of the framework 130. In some examples, the pin 440 can have the dumbbell-like shape as shown, with an enlarged upper surface or head 454 and a smaller diameter central region 458. The central region 458 is sized to extend through the passage 452. The upper surface 454 has a size greater than that of the passage 452 and thus nests against the floor 450 (e.g., under the force of gravity).

The catch device 442 is shown in greater detail at the insert to FIG. 9, and includes a piston 470 and a catch body 472. The piston 470 can be of a known design and generally includes a shaft 474 and a housing 476. The piston 470 can be operated/actuated to move the shaft 474 linearly relative to the housing 476. The catch body 472 is carried by the shaft 474 opposite the housing 476, and is sized and shaped to releasably engage or capture the pin 440. For example, the catch body 472 can form or define a passage 478 sized to receive the central region 458 of the pin 440 as shown. Regardless, the housing 476 is mounted to the platform framework 130 so as to align the catch body 472 with the pin 440.

FIG. 8 reflects a locked or captured state of the capture and release mechanism 430. The pin 440 extends below the floor 450 and the piston 470 has been actuated to engage the catch body 472 with the pin 440. In this arrangement, then, the piston 470, and thus the platform framework 130, is secured to the pin 440, further, the pin 440 is secured to the floor 450, and thus the outer frame 150 of the body 124. As a result, the platform 122 and the body 124 are secured to one another. The capture and release mechanism 430 can be operated to release the body 124 relative to the platform 122 (at least at the point of connection established at the capture and release mechanism 430) by prompting the piston 470 to retract the shaft 474. This motion releases the catch body 472 from the pin 440. The pin 440 can have a relatively lightweight construction; with these and similar configurations, the pin 440 is readily dislodged from the passage 452 (e.g., for example, when the body 124 is driven from the platform 122 and contacts the ground 170). In some embodiments, then, where an imminent collision is detected or determined (or under other circumstances), the mechanisms 430 operate to release the body 124 from the platform 122 in a manner that facilitates contact between an underside of the body 124 and one or more of the tires 140. This release and contact operation is performed in a coordinate fashion with driven rotation and angular position of the tire(s) 140 that will contact the underside, thus sending the released body 124 in a desired/determined direction or safety path.

Regardless of an exact configuration, the capture and release mechanism 430 (or any other capture and release-type design) is operable as part of a safety exit operation such as those described in the '474 Patent. In general terms, under circumstances of a determined or predicted collision, the passenger pod or body is released from the platform; the so-released body is then caused to move or exit from the platform in a determined safest path, for example by contacting one or more of the wheels of the platform (also referred to as "AV exit"). The sections and the base of the passenger body are as a unit raised from touching the power platform after disconnection by a device incorporated into the passenger body by pressing a portion of the passenger body against the at least one tire of the power platform. The device is necessarily connected to the lowest portion of the passenger body just above the at least one tire. This device assures the release is in immediate sequence just before the pad contacts the tire using the same actuator. In the case of the use of the tire and motor direction and contact with the passenger body, this additional and optionally related invention assures the best form for the body.

The passenger access systems and methods of the present disclosure, and the AVs of the present disclosure implementing the passenger access systems and methods, are a marked improvement over previous designs. The passenger access systems and methods uniquely provides access to an interior of the AV's passenger pod or body using at least one motor and tire contact to a separable door portion of the passenger pod. The passenger access systems and methods of the present disclosure are software based in large part and thus less expensive and adaptable to fit conditions and various changing needs of the passenger in various applications One exceptional value of the present disclosure is reduced costs by eliminating door hinging or hatches and the considerable number of associated parts typical to common vehicle designs. In some embodiments, the passenger access opening may be a larger than normal door operated by the motor driven tire contact on the door formed as a ledge or similar surface. The door is a part of and even with the passenger body. This AV Exit version with door is inside and extends past and behind the tire/drive and suspension and around the back to provide structural support for the ledge. This larger than normal doorway integrating the tire ride ledge can then operate the door with the drive motor and tire. Doors on either side of the AV can work independently. The systems and methods of the present disclosure can eliminate some doors (as compared to conventional vehicle designs) in the case of a four-door access. These integrated tire-driven sliding doors are in-line with the body and do not require off-set tracks, eliminate the need for hinges and motors for just the door operation. The size opening option and mid-access may also eliminate the need for a hatch door. In total, it makes a safer AV less costly while providing automated access using existing components required for any AV, the suspension, sensors, processors, software system including optional AI management and decision making, drive motors and tires.

In some embodiments, the passenger access systems and methods of the present disclosure are beneficially incorporated in tandem with a safety exit system, such as those described in the '474 Patent. Systems and methods of the present disclosure can utilize typical to or exactly like the tire sending system of the above reference patent or to apply tire contact and motor movement to make an AV entry automatic even without such a safety system. With optional embodiments in which the passenger access systems and methods of the present disclosure are integrated with a safe exit system, such as those of the '474 Patent, the passenger access systems use the sending path space between the power platform and the passenger pod. This passageway appropriately permits pod segments to move in a typical fashion but is now software applied for the purpose of access as a daily use feature. The passenger access systems and methods of the present disclosure optionally use the safety exit systems of the '474 Patent or the ability of the at least one door portion using a passenger pod release and capture and the passenger pod passage space between the tires typical of that system to operate a complete exiting. The passenger access systems and methods of the present disclosure can optionally use a typical method of the safety exit systems of the '474 Patent including the tire motion and tire contact to drive a portion of the passenger body but now also for the purpose of providing access to the passenger pod. In some examples, the capture and release device(s) utilized with the safety exit system may also incorporate a tire press for the activation of the movement. In other examples, the capture and release device may be separate from the tire press device or the suspension tire contact means.

Although the present disclosure has been described with reference to preferred embodiments, workers skilled in the art will recognize that changes can be made in form and detail without departing from the spirit and scope of the present disclosure.

The invention claimed is:

1. An autonomous vehicle comprising:
   a platform including framework maintaining a battery and at least one wheel assembly, wherein the wheel assembly includes a tire and a motor;
   a passenger body including an outer frame and at least one door slidably maintained by the outer frame, wherein the door includes a contact surface;
   wherein the passenger body is configured to nest within a footprint of the framework, including the contact surface being aligned with the tire;
   a passenger access control module programmed to perform a passenger access operation in which the tire is in contact with the contact surface and the motor is operated to rotate the tire causing the door to move relative to the outer frame.

2. The autonomous vehicle of claim 1, further comprising a suspension system component carried by the platform framework proximate the wheel assembly, wherein the suspension system component is operable to cause the tire to lift upwardly toward the contact surface as part of the passenger access operation.

3. The autonomous vehicle of claim 1, further comprising:

a mechanical connection unit connecting the body with the platform, wherein the mechanical connection unit is configured to transition between a first state in which the body is attached to the platform at the mechanical connection unit and a second state in which the body is released from the platform at the mechanical connection unit;

at least one sensor carried by one of the platform and the body;

a safety control module in communication with the sensor and programmed to prompt transition of the mechanical connection unit from the first state to the second state to release the body from the platform, followed by the released body contacting the tire such that contact with the tire sends the released body away from the platform.

\* \* \* \* \*